3,097,144
HEAT-CURED, POLYMERIC, MEDICINAL DOSAGE FILM COATINGS CONTAINING A POLYVINYL-PYRROLIDONE COPOLYMER, POLYETHENOID ACID, AND POLYETHYLENE GLYCOL
Gilbert S. Banker, West Lafayette, Ind., assignor to The Upjohn Company, Kalamazoo, Mich., a corporation of Delaware
No Drawing. Filed Oct. 14, 1960, Ser. No. 62,543
4 Claims. (Cl. 167—82)

This invention relates to coating compositions and the coating of medicinals. More particularly, this invention relates to coating compositions which are solutions of polyethylene glycol, a polyethenoid acid, a copolymer represented by the formula $(R-Y)$ wherein R is the comonomer N-vinyl-2-pyrrolidone and Y is a comonomer selected from the group consisting of N-vinyl-2-pyrrolidone, vinyl acetate, vinyl stearate, vinyl chloride, styrene, acrylic acid and methyl acrylate; the process of applying such compositions; and medicinals, usually tablets, which have been coated with the said compositions.

It is well known in the art of pharmaceutical manufacturing to provide solid medicinal dosage forms, in most instances tablets, with a protective coating. The coating can serve to protect the dosage form from moisture, reduce wear and chipping during handling and shipping, disguise unpleasant tastes and odors, and otherwise enhance the pharmaceutical elegance.

To overcome the difficulties encountered with sugar coating, namely the requirement for a multiplicity of applications of coating composition which is a time-consuming operation demanding a high degree of skill by the operator and resulting in a thick coating, a new group of materials have been introduced and are known generically as film-formers. Many compositions containing film-formers have been introduced for coating purposes. However, there have been various disadvantages connected with each particular composition. Th pharmaceutical art has therefore continued the search for new and better coating compositions. This continued search has as its object the provision of coating compositions having advantages in the areas of ease and uniformity of application, saving in time and materials, coatings having better protection and storage qualities and coatings with a more elegant appearance.

According to the present invention, it has been discovered that coating compositions consisting essentially of a solution of (a) a polyethylene glycol having an average molecular weight of up to 20,000, (b) a polyethenoid acid, (c) a copolymer represented by the following formula $(R-Y)$ wherein R represents the comonomer N-vinyl-2-pyrrolidone, and Y represents a comonomer selected from the group consisting of N-vinyl-2-pyrrolidone, vinyl acetate, vinyl chloride, styrene, acrylic acid and methyl acrylate, and wherein the ratio by weight of R to Y is between 30:70 and 70:30, can be applied to solid medicinal dosage forms to form a coating having superior properties. In addition the coating compositions can contain coloring agents such as dyes, pigments and lakes as well as flavoring and sweetening agents. A preferred adjuvant is a polishing wax which can be added to the coating solutions to provide a self-polishing coat.

The coating compositions of the present invention, in addition to providing the usual advantages of coatings, have the additional advantages of permitting the use of anhydrous solvent systems to facilitate rapid drying and the circumvention of difficulties encountered with water sensitive drugs; providing a shorter time in the coating process than is possible with other types of coating; and enabling the application of coatings and duplication thereof by less-skilled operators. The coatings so applied have the advantages of being the thinnest, resulting in economies in materials, packaging and shipping costs; coating does not obliterate tablet imprints or emblems thereby permitting full product identification without costly finished goods printing. The coatings quickly dissolve in the stomach and are self-polishing when polishing waxes are added to the coating compositions.

Broadly, the principal film-forming ingredient of the present invention is a copolymer represented by the formula $(R-Y)$ wherein R is the comonomer N-vinyl-2-pyrrolidone and Y is a comonomer selected from the group consisting of N-vinyl-2-pyrrolidone, vinyl acetate, vinyl stearate, vinyl chloride, styrene, acrylic acid and methyl acrylate. The ratio, by weight of R to Y can be from about 30:70 to about 70:30. This ratio can vary depending upon the particular comonomer selected for Y, and, of course, there will be no ratio when Y is N-vinylpyrrolidone. The total average molecular weight of the copolymer can be from about 40,000 to about 160,000.

Mixtures of copolymers can be used. For example a coating solution can be prepared utilizing polyvinylpyrrolidone and polyvinylpyrrolidone-vinyl acetate copolymer. Each specific copolymer having a characteristic disintegration pattern, advantageously, the selection and mixing of the copolymers can be done to provide a wide range of solubilities, or more particularly, disintegration rates for the coatings.

A preferred copolymer is polyvinylpyrrolidone characterized by a viscosity co-efficient, i.e., K value of 26 to 36 and a molecular weight of about 40,000.

The copolymers comprise from about 4 to about 20% w./v. of the coating solutions and from about 35 to about 95% w./w. of the dry coating.

The second principal ingredient is a polyethylene glycol. The polyethylene glycol can have an average molecular weight of up to 20,000. Preferred is a combination of polyethylene glycol 6000 (3 parts) and polyethylene glycol 9000 (1 part). The polyethylene glycol is used in a concentration of from about 1–5% w./v. of the coating composition and from about 4–20% w./w. of the dry coating.

The third principal ingredient is a polyethenoid acid. The polyethenoid acid can be, for example, a diethenoid acid such as linoleic; a triethenoid acid such as linolenic, hiragonic, and eleostearic; a tetraethenoid acid such as arachidonic, moroctic, parinaric, timnodonic, clupanodonic, nisinic and thynnic. Preferred are the readily available linoleic and linolenic acids. The polyethenoid acid comprises from about 0.25 to 2% w./v. of the coating composition and about 1–8% w./w. of the dry coating.

A preferred adjuvant to be included in the coating compositions is a polishing wax. A polishing wax, such as carnauba wax and 70% chlorinated paraffin (chlorowax), can be used in a concentration of from 1 to 5% w./v. of the coating composition.

Additional adjuvants which can be added are coloring agents such as the non-toxic dyes, lakes and pigments which have been certified for use in the food, drug and cosmetic industry; flavoring agents to impart a pleasant taste, such as peppermint oil, oil of wintergreen, licorice, and spearmint; sweetening agents such as saccharin and sodium cyclamate; and opacifiers such as titanium dioxide.

The coating compositions are prepared by dissolving the solid ingredients in a suitable volatile solvent or in a system of two or more miscible co-solvents. In a preferred coating composition, a solution is prepared utilizing ethanol (95%) as the solvent. Anhydrous ethanol, methanol, propanol, isopropanol, ethyl methyl ketone, acetone and water can also be used. Another preferred solvent system comprises an alcohol, an ester and a ketone, to wit, butyl alcohol, butyl acetate, and acetone in the ratio of 1:1:2 by volume. When polishing waxes are included, suitable solvents are tetrachloroethylene, benzene, chloroform, ether and carbon tetrachloride.

The coatings can be applied using the conventional coating apparatus and procedure. For example, tablets can be placed in a standard rotating coating pan and the coating composition can be sprayed onto the tablets or poured over the tumbling tablets from a ladle. The coating composition is applied in several increments with the amount applied each time being that amount which is sufficient to wet the surface of all the tablets in the pan. Removal of the volatile solvents can be facilitated by means of a current of warm air being blown into the pan. Application of the coating composition is continued until the desired thickness of coating is deposited.

An alternative method of application is the newer air suspension method. This method and the appropriate apparatus is illustrated by Wurster in U.S. Patent No. 2,799,241 and in the J. A. Ph. A., Scientific Edition, August 1959, at page 451. By these methods, tablets or other solid medicinal dosage forms are suspended and tumbled in a current of air with the coating composition being blown into the system.

After depositing the coating on the tablets, the coating is cured to harden it. The curing process is accomplished by placing the tablets in drying cabinets at about 105° F. for at least 3 hours. Conveniently, the tablets can be left in the cabinets at 105° F. overnight. Higher temperatures, when compatible with the medicinal agents, can be used for a shorter drying period and lower temperatures for a longer period.

The following examples are illustrative of the processes and products of this invention and are not to be construed as limiting.

*Example 1*

One thousand milliliters of a film-coating solution suitable for application to tablets to form films of any desired thickness can be prepared as follows:

| | | |
|---|---|---|
| Polyvinylpyrrolidone | gm | 45.0 |
| Polyethylene glycol 6000 | gm | 30.0 |
| Polyethylene glycol 9000 | gm | 12.0 |
| Chlorowax 70 | gm | 18.0 |
| Cetyl alcohol | gm | 6.0 |
| Linoleic acid | gm | 3.0 |
| Polyoxyethylene sorbitan monolaurate | gm | 1.0 |
| D. and C. Yellow 10 | gm | 0.5 |
| Deionized water | ml | 3.0 |
| S.D. Alcohol 3A | ml | 350.0 |
| Tetrachloroethylene | ml | 300.0 |
| S.D. Alcohol 3A, q.s. ad | ml | 1000.0 |

The cetyl alcohol, polyethlene glycol 9000, polyethylene glycol 6000, polyvinylpyrrolidone, polyoxethylene sorbitan monolaurate, and linoleic acid are dissolved in 350 ml. of hot alcohol in the order given. The dye is dissolved in the hot water and this solution is added to the alcohol solution. The chlorowax 70 is added to warm tetrachloroethylene. The warm alcoholic solution is added to the warm tetrachloroethylene solution with stirring.

The resulting clear solution may be applied warm or cool, in small portions with partial drying between applications or as a continuous spray. The film-coating has a disintegration time of 2½ to 3 minutes in artificial gastric juice (pH 1.2).

*Example 2*

One thousand milliliters of a film-coating composition suitable for application to tablets to form films of any desired thickness may be prepared as follows:

| | | |
|---|---|---|
| Polyvinylpyrrolidone-vinyl acetate (50:50) copolymer (Antara E-535) | gm | 200.0 |
| Polyethylene glycol 6000 | gm | 30.0 |
| Polyethylene glycol 9000 | gm | 10.0 |
| Chlorowax 70 | gm | 10.0 |
| Cetyl alcohol | gm | 8.0 |
| Linoleic acid | ml | 5.0 |
| Polyoxyethylene sorbitan monolaurate | ml | 0.8 |
| D. and C. Yellow 10 | gm | 0.6 |
| S.D. Alcohol 3A | ml | 200.0 |
| Deionized water | ml | 10.0 |
| Tetrachloroethylene | ml | 280.0 |
| S.D. Alcohol 3A, q.s. ad | ml | 1000.0 |

This formulation is prepared and is applied to tablets in the same manner as the preceding example.

*Example 3*

One thousand milliliters of coating composition is prepared from the following types and amounts of ingredients:

A

| | | |
|---|---|---|
| Polyvinylpyrrolidone | gm | 40 |
| Polyethylene glycol 9000 | gm | 10 |
| Linoleic acid | gm | 2.5 |
| S.D. Alcohol 3A, q.s. ad | ml | 1000 |

B

| | | |
|---|---|---|
| Polyvinylpyrrolidone | gm | 200 |
| Polyethylene glycol 9000 | gm | 10 |
| Linoleic acid | gm | 2.5 |
| S.D. Alcohol 3A, q.s. ad | ml | 1000 |

C

| | | |
|---|---|---|
| Polyvinylpyrrolidone | gm | 40 |
| Polyethylene glycol 9000 | gm | 50 |
| Linoleic acid | gm | 2.5 |
| S.D. Alcohol 3A, q.s. ad | ml | 1000 |

D

| | | |
|---|---|---|
| Polyvinylpyrrolidone | gm | 40 |
| Polyethylene glycol 9000 | gm | 10 |
| Linoleic acid | gm | 20 |
| S.D. Alcohol 3A, q.s. ad | ml | 1000 |

In the preceding Formulas A, B, C, and D, the ingredients are dissolved in the alcohol in the order given.

In the preceding formulas polyvinylpyrrolidone-vinyl acetate copolymer can be used in place of polyvinylpyrrolidone.

*Example 4*

One thousand milliliters of a self-polishing coating composition is prepared from the following types and amounts of ingredients:

| | | |
|---|---|---|
| Polyvinylpyrrolidone | gm | 40 |
| Polyethylene glycol 9000 | gm | 10 |
| Chlorowax 70 | gm | 10 |
| Tetrachloroethylene | ml | 200 |
| Linoleic acid | gm | 2.5 |
| S. D. Alcohol 3A, q.s. ad | ml | 1000 |

The chlorowax is dissolved in the tetrachloroethylene and the remaining ingredients are dissolved in the alcohol before the two solutions are mixed together.

*Example 5*

One thousand milliliters of coating composition is prepared from the following types and amounts of ingredients:

A

| | | |
|---|---|---|
| Polyvinylpyrrolidone | gm | 100 |
| Polyethylene glycol 1500 | gm | 40 |
| Linolenic acid | gm | 5 |
| Acetone—2 parts. | | |
| Butyl acetate—1 part. | | |
| Butyl alcohol—1 part, q.s. | cc | 1000 |

B

| | | |
|---|---|---|
| Polyvinylpyrrolidone-vinyl acetate copolymer | gm | 40 |
| Polyethylene glycol 1500 | gm | 40 |
| Linolenic acid | gm | 5 |
| Acetone—2 parts. | | |
| Butyl acetate—1 part. | | |
| Butyl alcohol—1 part, q.s. | cc | 1000 |

C

| | |
|---|---|
| Polyvinylpyrrolidone-vinyl chloride (60:40) copolymer _____ gm__ | 60 |
| Polyethylene glycol 1000 _____ gm__ | 40 |
| Linoleic acid _____ gm__ | 5 |
| Acetone—2 parts. | |
| Butyl acetate—1 part. | |
| Butyl alcohol—1 part, q.s. _____ cc__ | 1000 |

D

| | |
|---|---|
| Polyvinylpyrrolidone-styrene (50:50) copolymer _____ gm__ | 50 |
| Polyethylene glycol 400 _____ gm__ | 50 |
| Linolenic acid _____ gm__ | 5 |
| Acetone—2 parts. | |
| Butyl acetate—1 part. | |
| Butyl alcohol—1 part, q.s. _____ cc__ | 1000 |

E

| | |
|---|---|
| Polyvinylpyrrolidone-acrylic acid (50:50) copolymer _____ gm__ | 50 |
| Polyethylene glycol 1000 _____ gm__ | 50 |
| Linoleic acid _____ gm__ | 5 |
| Acetone—2 parts. | |
| Butyl acetate—1 part. | |
| Butyl alcohol—1 part, q.s. _____ cc__ | 1000 |

F

| | |
|---|---|
| Polyvinylpyrrolidone-methyl acrylate (50:50) copolymer _____ gm__ | 50 |
| Polyethylene glycol 1500 _____ gm__ | 50 |
| Linoleic acid _____ gm__ | 5 |
| Acetone—2 parts. | |
| Butyl acetate—1 part. | |
| Butyl alcohol—1 part, q.s. _____ cc__ | 1000 |

In the preceding Formulas A through F, the ingredients are dissolved in the solvent system in the order given.

Example 6

Ten thousand average size (7/16 inch punch) calcium phosphate tablets, monogrammed and weighing 0.62 gm. each, are placed in a 12-inch coating pan. The pan is rotated at about 30 revolutions per minute and the composition of Example 1 is sprayed over the tablets. The composition is sprayed on at a rate which is adequate to keep the tablet mass damp while not producing sticking. The spraying is continued until a coating of desired thickness is produced. The tablets are then removed and cured overnight in a drying oven at a temperature of 105° C.

Following the procedure of the preceding example, tablets are similarly coated substituting the compositions of Examples 2, 3, 4, and 5 for the composition of Example 1 in the preceding example.

What is claimed is:

1. A solid medicinal dosage form protected by a coating consisting essentially of (a) a polyethylene glycol having an average molecular weight of up to 20,000, (b) a polyethenoid acid, and (c) a copolymer represented by the formula:

$$-(R-Y)-$$

wherein R represents the comonomer N-vinyl-2-pyrrolidone, and Y represents a comonomer selected from the group consisting of N-vinyl-2-pyrrolidone, vinyl acetate, vinyl chloride, styrene, acrylic acid, and methyl acrylate, and the ratio by weight of R to Y is between 30:70 and 70:30 wherein the coating has been cured by heating to about 105° F. for about 3 hours.

2. A solid medicinal dosage form protected by a coating consisting essentially of (a) from about 4 to about 20% w./w. of a polyethylene glycol having an average molecular weight of up to 20,000, (b) from about 1 to about 8% w./w. of a polyethenoid acid, and (c) from about 35 to about 95% w./w. of a copolymer represented by the formula:

$$-(R-Y)-$$

wherein R represents the comonomer N-vinyl-2-pyrrolidone, and Y represents a comonomer selected from the group consisting of N-vinyl-2-pyrrolidone, vinyl acetate, vinyl chloride, styrene, acrylic acid, and methyl acrylate, and the ratio by weight of R to Y is between 30:70 and 70:30 wherein the coating has been cured by heating to about 105° F. for about 3 hours.

3. A process for producing a solid medicinal dosage form protected by a coating which includes the steps of (1) forming a coating on the said dosage form with a solution of a volatile solvent and (a) a polyethylene glycol having an average molecular weight of up to 20,000, (b) a polyethenoid acid, and (c) a copolymer represented by the following formula:

$$-(R-Y)-$$

Wherein R represents the comonomer N-vinyl-2-pyrrolidone, and Y represents a comonomer selected from the group consisting of N-vinyl-2-pyrrolidone, vinyl acetate, vinyl chloride, styrene, acrylic acid, and methyl acrylate, and the ratio by weight of R to Y is between 30:70 and 70:30, and (2) curing the coating by heating at 105° F. for at least 3 hours.

4. A process for producing a solid medicinal dosage form protected by a coating which includes the steps of (1) forming a coating on the said dosage form with a solution of a volatile solvent and (a) from about 4 to about 20% w./w. of solutes of a polyethylene glycol having an average molecular weight of up to 20,000, (b) from about 1 to about 8% w./w. of solutes of a polyethenoid acid, and (c) from about 35 to about 95% w./w. of solutes of a copolymer represented by the following formula:

$$-(R-Y)-$$

wherein R represents the comonomer N-vinyl-2-pyrrolidone, and Y represents a comonomer selected from the group consisting of N-vinyl-2-pyrrolidone, vinyl acetate, vinyl chloride, styrene, acrylic acid, and methyl acrylate, and the ratio by weight of R to Y is between 30:70 and 70:30, and (2) curing the coating by heating at 105° F. for at least 3 hours.

References Cited in the file of this patent

UNITED STATES PATENTS

| | | |
|---|---|---|
| 2,512,192 | Yen et al. | June 20, 1950 |
| 2,693,436 | Spradling | Nov. 2, 1954 |
| 2,693,437 | Spradling | Nov. 2, 1954 |
| 2,795,505 | Finck et al. | June 11, 1957 |
| 2,816,061 | Doerr et al. | Dec. 10, 1957 |
| 2,816,062 | Doerr et al. | Dec. 10, 1957 |
| 2,881,085 | Endicott et al. | Apr. 7, 1959 |
| 2,928,770 | Bardani | Mar. 15, 1960 |
| 2,954,322 | Heilig | Sept. 27, 1960 |
| 2,954,323 | Endicott et al. | Sept. 27, 1960 |
| 2,991,226 | Millar et al. | July 4, 1961 |
| 3,030,273 | Zagnoli | Apr. 17, 1962 |

OTHER REFERENCES

"Vinylpyrrolidone" (N-vinyl-2-pyrrolidone), Antara Chem. Div., General Aniline and Film Corp., 435 Hudson St., New York, N.Y., pp. 1–25, pub. March 1958, September 9, 1958.

"Transformulation to Film Coating," Gross et al., Drug and Cosmetic Industry, vol. 86, No. 2, February 1960, pp. 170–1, 264, 288–291.